(12) United States Patent
Dahl

(10) Patent No.: US 9,367,178 B2
(45) Date of Patent: Jun. 14, 2016

(54) TOUCHLESS INTERFACES

(75) Inventor: Tobias Dahl, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 920 days.

(21) Appl. No.: 13/503,347

(22) PCT Filed: Oct. 25, 2010

(86) PCT No.: PCT/GB2010/051789
§ 371 (c)(1),
(2), (4) Date: Aug. 14, 2012

(87) PCT Pub. No.: WO2011/048433
PCT Pub. Date: Apr. 28, 2011

(65) Prior Publication Data
US 2012/0299820 A1  Nov. 29, 2012

(30) Foreign Application Priority Data

Oct. 23, 2009 (GB) .................................. 0918596.8
Feb. 3, 2010 (GB) .................................. 1001733.3

(51) Int. Cl.
*G09G 5/00* (2006.01)
*G06F 3/043* (2006.01)
*G06F 3/01* (2006.01)
*G01S 15/00* (2006.01)
*G01S 15/87* (2006.01)

(52) U.S. Cl.
CPC .............. *G06F 3/043* (2013.01); *G01S 15/003* (2013.01); *G01S 15/876* (2013.01); *G06F 3/011* (2013.01)

(58) Field of Classification Search
CPC ......... G06F 3/016; G06F 3/011; G06F 3/038; G06F 3/03333; G06F 3/03313
USPC ................................. 345/156–158, 173–179; 178/18.01–18.04
See application file for complete search history.

(56) References Cited

U.S. PATENT DOCUMENTS

| | | |
|---|---|---|
| 7,000,474 B2 * | 2/2006 | Kent .............................. 73/579 |
| 2006/0161870 A1 | 7/2006 | Hotelling et al. |
| 2007/0288194 A1 | 12/2007 | Boillot |
| 2008/0048878 A1 | 2/2008 | Boillot |
| 2008/0297340 A1 * | 12/2008 | Popa et al. ................. 340/539.1 |

FOREIGN PATENT DOCUMENTS

WO  WO 2008/001202    1/2008
WO  WO 2009/115799    9/2009

OTHER PUBLICATIONS

International Search Report for International Application No. PCT/GB2010/051789 dated Mar. 18, 2011 by European Patent Office.

(Continued)

*Primary Examiner* — Kimnhung Nguyen
(74) *Attorney, Agent, or Firm* — Beyer Law Group LLP

(57) ABSTRACT

The shape or position of an object is estimated using a device comprising one or more transmitters and one or more receivers, forming a set of at least two transmitter-receiver combinations. Signals are transmitted from the transmitters, through air, to the object. They are reflected by the object and received by the receivers. A subset of the transmitter-receiver combinations which give rise to a received signal meeting a predetermined clarity criterion is determined. The positions of points on the object are estimated using substantially only signals from the subset of combinations.

21 Claims, 4 Drawing Sheets

(56) References Cited

OTHER PUBLICATIONS

Schindel et al., "The Design and Characterization of Micromachined Air-Coupled Capacitance Transducers", IEEE Transactions on Ultrasonics, Ferroelectrics, and Frequency Control, vol. 42, No. 1, Jan. 1995, pp. 42-50.

L.L. Scharf, "Statistical Signal Processing", Chapter 4.9-4.12, Prentice Hall, 1 edition, Jul. 1, 1991.

* cited by examiner

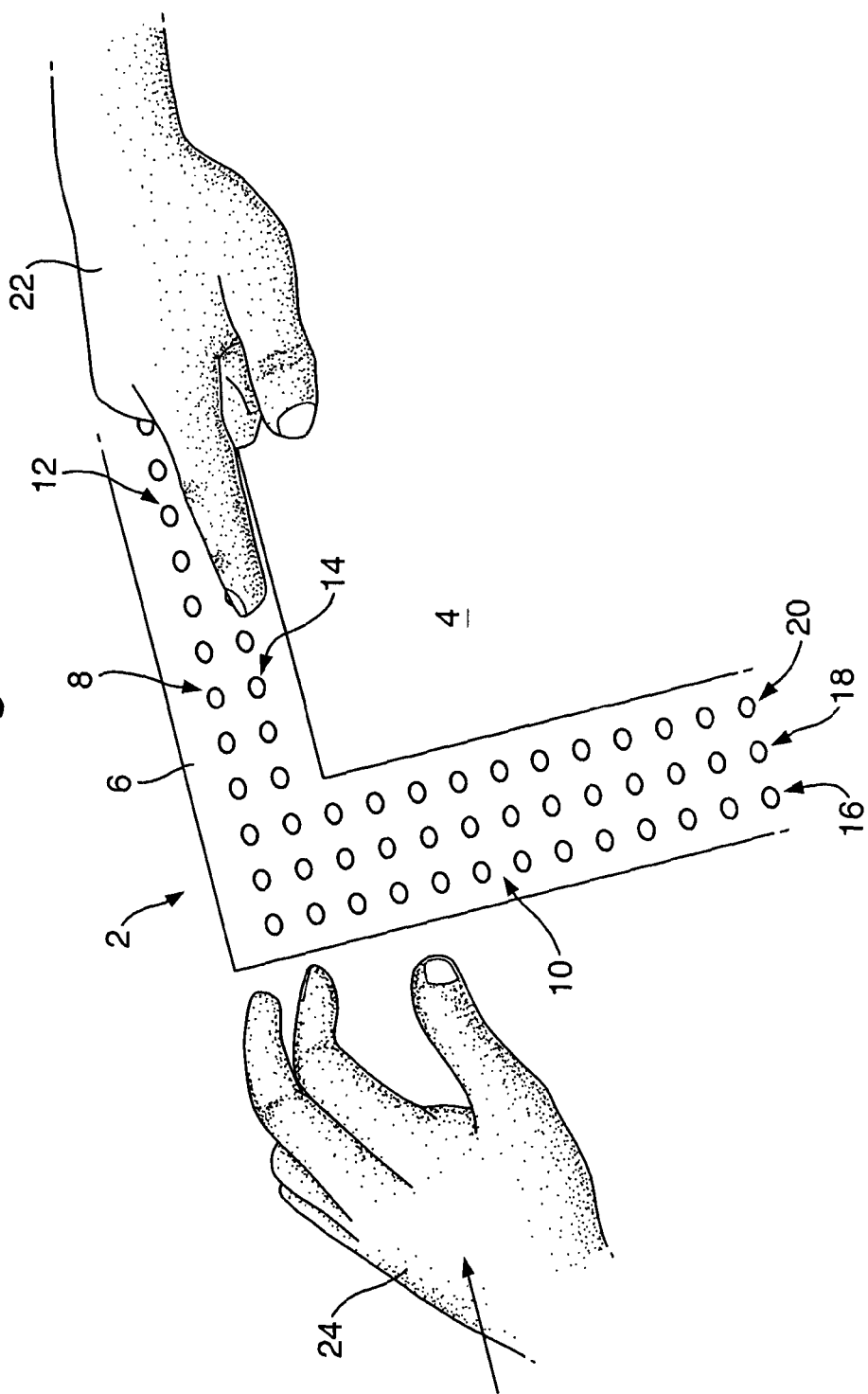

TOUCHLESS INTERFACES

RELATED APPLICATIONS

This application is the National Stage of International Application No. PCT/GB2010/051789, filed Oct. 25, 2010, which claims the benefit of GB 0918596.8, filed Oct. 23, 2009 and GB 1001733.3, filed Feb. 3, 2010. Each of these applications is hereby expressly incorporated by reference in its entirety herein.

This invention relates to touchless interfaces employing transducers to determine information about an object from reflections from the object of signals, particularly although not exclusively, ultrasonic signals.

It is known for an electronic device, such as a desktop computer or a mobile telephone, to determine the motion of an object, such as a human hand, by transmitting signals from one or more transmitters and receiving reflections of the signals from the object at one or more receivers, for the purpose of controlling the device. For example, WO 2009/115799 describes some such devices.

Given that at least some previous proposals require the inclusion of additional hardware in the form of ultrasonic transducers, it is natural to make full use of them, particularly where the application calls for an image of the object to be built up (as opposed say to recognition of a simple motion tendency). Where a device has more than one transmitter and/or more than one receiver, the presumption has typically been to utilise all available transmitter-receiver pairs (or channels). In some applications (e.g. medical imaging) this can be done by combining the signals received by all available receivers (e.g. by averaging or summing the signals received by each). However, such processing can be inefficient and computationally costly.

When viewed from a first aspect, the present invention provides a method of estimating the shape and/or position of an object using a device comprising one or more transmitters and one or more receivers, forming a set of at least two transmitter-receiver combinations, said method comprising:

- transmitting signals from the transmitter(s), said signals travelling through air to the object, being reflected by the object and received by the receiver(s);
- determining a subset of the transmitter-receiver combinations which give rise to a received signal meeting a predetermined clarity criterion; and
- estimating positions for a plurality of points on said object using substantially only signals from said subset of combinations.

The invention extends to a device configured to estimate the shape and/or position of an object, the device comprising:

- one or more transmitters and one or more receivers forming a set of at least two transmitter-receiver combinations, said transmitters being arranged to transmit signals;
- means for determining a subset of the transmitter-receiver combinations which give rise to a received signal meeting a predetermined clarity criterion; and
- means for estimating positions for a plurality of points on said object using substantially only signals from said subset of combinations.

The invention also extends to a computer software product, and to a carrier bearing the same, configured, when run on a device comprising one or more transmitters and one or more receivers, forming a set of at least two transmitter-receiver combinations, to operate the device to estimate the shape and/or position of an object, the software product comprising:

- instructions for transmitting signals from the transmitter(s);
- logic for determining a subset of the transmitter-receiver combinations which give rise to a received signal meeting a predetermined clarity criterion; and
- logic for estimating positions for a plurality of points on said object using substantially only signals from said subset of combinations.

The skilled person will appreciate that, by using only signals from transmitter-receiver pairs that have a clear 'view' of the object, and by determining the position of more than one point on the object, the accuracy of the resulting position or shape estimates can be substantially improved. In particular, signals from transmitter-receiver combinations which do not meet the clarity criterion are excluded, resulting in enhanced performance. This can be contrasted with an approach in which signals from all transmitter-receiver pairs are used to determine a position estimate of a single point on an object, for example by averaging information relating to signals received on all available channels.

Moreover, the number of transmitter-receiver combinations that are involved in the estimation is less than if all available transmitter-receiver pairs are used, and thus the processing requirements can be significantly lower.

The object is not limited to any particular class or type of object, but in some embodiments it is a pointing or gesticulating implement such as a stylus, a human hand, or an extended human finger. The object may be just a part of a larger object, such as the tip of a finger. In some embodiments, the shape and/or position of multiple objects is estimated substantially simultaneously.

In one set of embodiments the clarity criterion is defined such that it is met by a transmitter-receiver combination when no other reflective surface is at the same or similar time-of-flight distance as the object for that combination; conversely, the criterion is preferably such that it is not met when another reflective surface is at the same or similar time-of-flight distance from the combination as the object. Two time-of-flight distances may be similar if their difference is less a predetermined amount, e.g. less than 5 centimeters, or less than 1 centimeter.

WO 2009/115799, which is hereby incorporated by reference in its entirety, describes various approaches for analysing received signals, including calculating impulse response images and applying filters to these. This is described in more detail below.

In some embodiments, the clarity criterion is implemented by determining whether the received signals for a particular transmitter-receiver combination have a clear leading edge; this may be implemented by detecting a match with a leading-edge filter. Such a filter would typically require a certain level of contrast over a certain time to indicate the initial absence of signal followed by presence of a suitable signal. Clearly the particular details of such a filter can be chosen, without the exercise of inventive skill, to suit the particular application.

The transmit signals could be optical or other electromagnetic signals, but they are preferably acoustic, more preferably ultrasonic having frequencies greater than 20 kHz, especially greater than 30 kHz. In some embodiments the frequency might be in the range 35-45 kHz. In other embodiments a higher frequency than this could be used. Thus in another set of embodiments the frequency is greater than 50 kHz or even greater than 100 kHz—e.g. between 100 and 200 kHz. The transmitters could be controlled to transmit continuous signals or discrete impulses. The signal may comprise a single frequency, or may comprise a plurality of frequencies.

The nature of the transmit signals can be selected as appropriate. In a simple embodiment they could comprise a single impulse or spike, i.e. approximating a Dirac delta function within the limitations of the available bandwidth. This has some advantages in terms of requiring little, if any, processing of the 'raw signal' to calculate impulse responses (in the theoretical case of a pure impulse, no calculation is required) but gives a poor signal-to-noise ratio because of the deliberately short transmission. In other embodiments the transmit signals could be composed of a series or train of pulses. This gives a better signal-to-noise ratio than a single pulse without greatly increasing the computation required. Pulse trains can be used to compute impulse responses at comparatively low processing cost because many elements in the correlation chain are zeros, hence the corresponding steps in the multiply-and-sum operations, i.e. the convolution, can be skipped. Often, this can reduce the overall processing cost by 80% or 90%. In other embodiments the transmit signals comprise one or more chirps—i.e. a signal with rising or falling frequency. These give a good signal-to-noise ratio and are reasonable for calculating the impulse responses using a corresponding de-chirp function applied to the 'raw' received signal.

The recited transmitter-receiver combinations may comprise a single transmitter and a single receiver. In a set of preferred embodiments however transmitter-receiver combinations comprising a plurality of transmitters or receivers are used. In one such set of embodiments combinations including a plurality of receivers are used which allows directional information for the reflected signals to be derived by comparing the small time delays in receipt of the signal at the respective receivers (coupled of course with knowledge of the respective positions of the receivers on the device).

In another (overlapping) set of embodiments the transmitter-receiver combinations used comprise a plurality of transmitters (at least some of which could be the same physical transducers as the receivers referred to above, in embodiments employing transducers which can be used as transmitters or receivers). Such plural transmitters can be used together to transmit the same signal with relative time delays in order to 'steer' the transmission in a certain direction. This could be useful where an object has already been detected at an approximate location or in an approximate direction to direct energy in that direction and thus obtain more detailed or accurate information. It also has the beneficial effect of reducing the probability of unwanted reflections from other objects interfering with the signals of interest, i.e. it improves the signal-to-noise ratio.

In either case above the greater the number of transducers, the more effective this approach can be. Also, having the transducers close together makes this approach more effective. Preferably therefore at least some of the transmitters or receivers are provided in a group in which the maximum distance between any transmitter or receiver and its nearest neighbour is less than the longest wavelength transmitted by either of them, or by the device, in normal use; more preferably, less than half such a wavelength. Similarly it is preferred that at least some of the transmitters or receivers are provided in a group in which the maximum distance between any transmitter or receiver and its nearest neighbour is less than the longest wavelength transmitted by either of them, or by the device, in normal use; more preferably, less than half such a wavelength. This allows the respective group to act as a phased-array and to direct or receive energy preferentially from a particular direction compared with other directions. Such a group can, in some embodiments, be considered as a single directional transducer. In some situations it may be desirable that the maximum distance between two transmitters or receivers be less than the smallest wavelength transmitted by either of them, or by the device, in normal use; sometimes less than half the smallest wavelength.

In one set of preferred embodiments the device is arranged to conduct a preliminary step in which a plurality, preferably all, of the transmitters transmit respective signals in sequence. A plurality, preferably all, of the receivers may then be used to determine transmitter-receiver pairs for which the clarity criterion is met—e.g. by having a sufficiently well-defined leading edge. These could be used to construct a two-dimensional matrix with entries indicating 'clear' pairings. The transmitter-receiver pairs may then be used for subsequent imaging. Of course rather than transmitter-receiver pairs, combinations comprising a plurality of transmitters and/or a plurality of receivers could be used for this step as described above, although if single-transmitter-receiver pairs are used, combinations with multiple transmitters and/or receivers may still be used for subsequent imaging.

Whether or not groups of transmitters or receivers are used in concert with each other, and whether or not such groups are closely spaced, their physical layout can be chosen to suit the application. However, in a set of preferred embodiments the transmitters and/or receivers are laid out in a regularly-spaced, preferably rectangular array. In one particular set of preferred embodiments such an array comprises at least two parallel rows of transducers. This has many potential benefits—e.g. in providing strong directivity in directions normal to the rows; this has been found to give specific benefits in the context of a hand-held mobile device since it provides a simple mechanism for strongly avoiding interference arising as a result of reflections from the hand holding the device.

Having two or more rows also allows a local two-dimensional "cluster" of elements to be defined. If such a cluster has a clear view of a part of the object, its transducers can be used to "image" the object of interest, taking advantage of the object being clearly visible, i.e. not hampered by overlapping signals from other objects. That is, if a two-dimensional cluster of receivers can clearly see the object of interest, all the necessary parameters for estimating the object's angle relative to this cluster could be determined. By contrast, if the device comprised a single ring of receivers, there would be an ambiguity in these angle estimates, i.e. it would not be straightforward to estimate both azimuth and elevation information.

More generally, however, a two-dimensional local cluster of transducers could be defined of any suitable pattern (e.g. a square, a circle, an ellipse, a sparse matrix or several sparse or dense matrices of any shape, taken from the overall layout of transducers). A transducer could sometimes be used as both a transmitter or a receiver, interchangeably. In some situations, i.e. when the object is close to a two-dimensional local cluster, three-dimensional position information for the object can be obtained using only the transducers of the local cluster. When the object is further away, the local cluster can provide accurate angular positioning (azimuth and elevation). To obtain the range to the object, an additional transmit channel, either within the local cluster or outside it, could be used to obtain an accurate 3D position for the object, consisting of two angles and a range, or alternatively a location in three-dimensional space. The roles of a local, two-dimensional receive cluster and a two-dimensional transmit cluster may also be reversed, by using scanning or transmit-beamforming techniques.

Mobile devices with two parallel rows of acoustic transducer elements are believed to be novel and inventive in their own right and thus, when viewed from a further aspect, the invention provides a handheld device comprising a plurality of acoustic transducers as part of a user interface, said transducers being arranged in at least two parallel rows.

From a further aspect, the invention provides a method of operating such a handheld device to estimate the shape and/or position of an object, and/or to characterise the motion of an object. The invention also extends to a computer software product, and to a carrier bearing the same, configured, when run on such a handheld device, to cause it to carry out such a method.

In a preferred set of embodiments the rows are parallel with an edge of the device. Preferably the device comprises a display or interaction surface and the rows are both on the same side of it—i.e. one of the rows lies between the display or interaction surface and the other row. An interaction surface might be a touch-sensitive panel, such as a touchpad, or it could simply be an area designated for interaction.

Preferably each row comprises at least three such elements. Preferably each row is longer than the distance between the rows.

Conveniently the rows are substantially straight, but this is not essential, e.g. they may be smoothly curving. The transducers may be located strictly along the row, but may also be staggered variously to one side or the other; for example, in a zigzag fashion. This has the advantage of reducing the spacing between elements in some directions, further improving the beamforming aspects of the solution.

The display or interaction surface may be of any shape, but is preferably a flat rectangle. In this case, the two rows preferably lie in substantially the same plane as the rectangle (albeit that they may be partly or completely recessed below the plane) and are preferably parallel to an edge of the rectangle.

The transducers are preferably substantially regularly spaced along the rows. The distance between adjacent transducers in some embodiments is equal to or less than half the maximum or average (mean, median or mode) or highest or base wavelength transmitted by one or more of the transducers in use (i.e. less than $\lambda/2$). However, the spacing may also be much larger than this, which can be easier to implement and might provide either aesthetic or design benefits.

The distance between the rows is not limited to any particular size; however, in some preferred embodiments it is equal to or less than $\lambda/2$.

Although only two rows have so far been discussed, it will be readily appreciated that more than two rows may be provided; for example, three, four, five or more.

In particularly preferred embodiments, the screen or interaction surface is surrounded by two concentric rings of transducer elements, preferably conforming to the shape of the screen or surface. Where the screen or surface is rectangular, it is preferably surrounded by two rectangular rings of transducers, one larger than the other. The rings may extend beyond the screen at the corners, e.g. onto the sides of the device, or may have gaps at the corners. Of course, in some embodiments, three, four, five or more concentric rings may be provided.

In some embodiments, the display or interaction surface is arranged to transmit an acoustic signal. Various arrangements are possible. In some embodiments the apparatus comprises a transmitting surface comprising a display screen or disposed in substantially overlapping relationship with a display screen. Other transducer elements may be provided as explained above; for example, the transmitting surface may be surrounded by a plurality of concentric rings of acoustic receivers. The other transducer elements may all be receivers, or may comprise both transmitters and receivers. Methods of the invention may comprise transmitting an acoustic signal from a transmitting surface, the transmitting surface comprising a display screen or being disposed in substantially overlapping relationship with a display screen.

The transmitting surface may also be a receiving surface, arranged to receive a reflection of an acoustic signal from an object of interest.

From a further aspect, the invention provides a method of characterising the shape, location or motion of an object, comprising:
  transmitting an acoustic signal from a transmitting surface, the transmitting surface comprising a display screen or being disposed in substantially overlapping relationship with a display screen;
  receiving a reflection of the signal from an object which is directly in front of the display screen; and
  characterising the shape, location or motion of the object using information determined from the received signal.

From another aspect, the invention provides apparatus for characterising the shape, location or motion of an object, comprising:
  a display screen;
  a transmitting surface comprising the display screen, or being disposed in substantially overlapping relationship with the display screen, and arranged to transmit an acoustic signal from substantially all of its surface;
  a receiver arranged to receive a reflection of the acoustic signal from an object which is directly in front of the display screen; and
  means for characterising the shape, location or motion of the object using information determined from the received signal.

Such an arrangement is advantageous in that it can reduce or obviate the need for separate transmitters located apart from the display screen. This can lead to a more attractive design than is otherwise possible; especially when the display screen spans substantially the full width and/or height of the apparatus.

The transmitting surface may also be a receiving surface, arranged to receive the reflection of the acoustic signal. However, it is envisaged that, more commonly, the receiver(s) will be separate from the transmitting surface. Preferably, the apparatus comprises a plurality of receivers, each arranged to receive a reflection of the acoustic signal from the object directly in front of the display screen, and information determined from all these received signals may be used to characterise the shape, location or motion of the object.

The use of a transmitting surface in accordance with at least some embodiments of the invention can provide improved accuracy when characterising the shape, location or motion of the object, since it reduces the possibility of signal-path confusion which arises when separate point transmitters are used. Preferably the transmitting surface is flat. When this is the case, it will be appreciated that, in contrast to the situation for peripherally-mounted transmitter, an acoustic signal transmitted by the transmitting surface is likely to have a shorter time of flight (TOF) between the surface, the part of the object (e.g. a user's fingertip) closest to the surface, and the receiver, than for any other part of the object. To give an example of this, with suitably placed receivers it is possible to mitigate the problem of the shape, location or motion of a part of the user's hand other than an intended fingertip being characterised mistakenly, instead of that of the intended fingertip.

A further advantage of some embodiments of these aspects of the invention may be found in a simplification of the calculations necessary to characterise the shape, location or motion of the object. In particular, a simpler, planar trilateration approach, based on the times-of-arrival of echoes at each of a plurality of receivers may be used, rather than a spatial intersection-of-ellipses calculation being required, as might be the case for a plurality of separate, point transmitters and receivers.

The transmitting surface is preferably sufficiently large that a fingertip may be moved in front of it to effect user input to the apparatus, which may be a hand-held portable device. Thus the area of the transmitting surface is preferably at least 2 square centimeters; but could be at least 25 square centimeters; and may be 100 square centimeters or more. The apparatus may instead be a larger device, such as a television set; the transmitting surface might therefore be considerably larger still; for example, 1 square meter or more.

The transmitting surface could also be used to receive a touch input to the apparatus; for example, it may additionally make use of known resistive or capacitative touchpad technology.

In embodiments in which the transmitting surface is disposed in substantially overlapping relationship with the display screen, preferably at least 50%, more preferably 75%, of the transmitter surface overlaps the display screen. As used herein the proportion of the area of the transmitter surface considered to overlap the display screen is that proportion area of the transmitter surface for which a normal to the transmitter surface passing through the area also intersects the display screen (the latter intersection not necessarily being normal to the display screen).

The display screen in accordance with the invention could form just a corner of a larger display surface—e.g. with the corner being arranged for motion-based interaction with an object and the rest of the display surface being passive. However, typically, the display screen of the invention does not form part of a larger display surface—i.e. all of the display surface acts as a transmitter (of course even in such embodiments, the apparatus may nonetheless comprise additional, separate display surfaces).

Where the transmitting surface overlaps the display screen it could be disposed behind the display screen but preferably it is disposed in front of it. This makes it much easier for the sound waves to be emitted unobstructed. Preferably therefore the transmitting surface is fully or partially transparent, at least in the area thereof which overlaps the display screen. It may, for example, comprise a glass or acrylic sheet; e.g. made of poly(methyl methacrylate). Alternatively, it may comprise a thin membrane, for example one made of polyethylene or polyvinylidene fluoride.

The display screen and transmitting surface are preferably both planar, but this is not essential, and one or both may comprise curved surfaces.

The transmitting surface may be in contact with display screen, e.g. over substantially an entire overlap region, or may be substantially spaced apart from the display screen, for example, separated by an air- or liquid-gap.

The display screen or larger display surface may use any suitable display technology; for example, LCD, electrophoretic, plasma, or organic LED.

The object may be anything suitable depending on the application—e.g. an artificial stylus, but more preferably, a human hand or digit. Its motion may be characterised by detailed tracking in two or three dimensions (e.g. by determining a sequence of position coordinates). Alternatively, an approach that discriminates between gestures (such as a circling motion of a hand or finger, or a sweep from left to right across the display screen), but which does not require such detailed tracking information, may be used.

While the apparatus is arranged to characterise the shape, location or motion of the object when it is directly in front of the display screen (i.e. on a normal to the display screen), this does not exclude the possibility of characterisation occurring in other positions. In fact, when a gesture-based interaction mode is being used, it is preferred that motion of the object is also characterised beyond the region defined by a projection of the display screen.

Various mechanisms for transmitting an acoustic signal from the transmitting surface are possible, some of which are known to the skilled person in other applications, and some of which are believed to be novel.

In some embodiments, the transmitting surface is arranged to transmit an acoustic signal when an electric potential is applied across it, either lengthwise or thickness-wise. To give an example, it may comprise piezo-electric material.

In some arrangements, it comprises a piezo-electric sheet mounted to a rigid backing surface and arranged to vary in thickness on application of an electric potential across its thickness. An acoustic signal may be transmitted by controlling the applied potential so as to cause the material to vibrate. In this way, an acoustic signal can be transmitted substantially uniformly across the whole transmitting surface.

In other arrangements, the transmitted surface comprises a piezo-electric sheet arranged to flex on application of an electric potential across its length or width.

In some embodiments, the transmitting surface is arranged to transmit an acoustic signal when a varying electric or magnetic field surrounds it. In this case, the apparatus preferably comprises means for generating a varying electric or magnetic field around the transmitting surface.

In some embodiments an actuator is coupled to the transmitting surface and is arranged to displace the transmitting surface as a whole. The actuator may be used to drive the transmitting surface back and forth substantially along a normal to the surface so as to transmit the acoustic signal. This is similar to the manner in which a conventional loud-speaker diaphragm operates. The actuator may comprise a coil and a ferromagnetic material arranged to displace the transmitting surface relative to the display screen or to a mount. Alternatively, the actuator may comprise one or more piezo-electric members, arranged to displace the surface. For example, the transmitting surface may be surrounded by a piezo-electric border arranged to move it relative to the display screen or to a mount.

In some embodiments, the transmitting surface is caused to transmit by the action of one or more energising transmitters which are arranged to direct acoustic energy through air towards the transmitting surface. The energising transmitter or transmitters are preferably located wholly or partially on the other side of the transmitting surface from the object. The energising transmitters may be configured to induce Lamb waves within the transmitting surface, but this is not essential. Such Lamb waves may be primarily extensional or primarily flexural. Lamb waves travel well within the transmitting surface, and can also couple well with the air on the front side of the surface. They are also relatively resilient to effects such as scratches or damaged parts of the surface. The acoustic signal may be emitted into air substantially uniformly across the transmitting surface, or may leave the transmitting surface more strongly at one or more points than at others.

An energising transmitter may comprise an acoustic transducer such as a piezo-electric speaker arranged to direct acoustic energy towards the transmitting surface. The acoustic energy may be focussed on a particular region of the transmitting surface using, for example, a parabolic reflector. The location and angle of the acoustic energy incident on the transmitting surface may be chosen to induce a particularly desirable pattern of Lamb waves. In some embodiments, one or more energising transmitters is controlled so as to cause the acoustic signal to be transmitted directionally from the transmitting surface; for example, by creating a plurality of concentrations of energy within the transmitting surface and using beamforming techniques to control the transmission of the acoustic signal from the transmitting surface.

In alternative embodiments, a plurality of actuators are coupled to the transmitting surface, each being arranged to generate surface acoustic waves in the transmitting surface. The actuators may be controlled so as to cause the surface acoustic waves to interfere in such a way that acoustic energy is transmitted directionally from the transmitting surface and/or is transmitted primarily from a particular point on the transmitting surface. This can be achieved when the movement in the surface induced by the interfering surface acoustic waves is sufficient for coupling of energy into the air. Coupling between surface acoustic waves and air can often be in the range of 1% of the energy travelling along the surface, depending on the material of the surface. Thus, energy needs to be focussed well in order to provide sufficient wave amplitudes for, say, tracking an object moving in the air over or in the vicinity of the surface. The location of a point from which signals are transmitted into the air may be variable, and control means may be provided which is configured to transmit sound more strongly from a point relatively close to the object than from another point on the transmitting surface which is relatively removed from the object. The control means may alternatively or additionally be configured to direct a beam of sound towards the object using beamforming techniques.

The acoustic signal may comprise one or more chirps, but in some preferred embodiments it comprises one or more pulses. The inventor has discovered that, at least in some arrangements, pulses can be more efficiently transmitted by the transmitting surface than chirps. Moreover, the non-linear amplifiers needed to generate pulses or pulse trains are typically easier to develop and fabricate than amplifiers supporting continuous wave-forms.

Any of the methods described with reference to earlier aspects may equally be used with these aspects also. In particular, when the apparatus comprises a plurality of transducers, a step of determining a subset of the transmitter-receiver combinations which give rise to a received signal meeting a predetermined clarity criterion may be performed. Beamforming using the transmitting surface alone or in combination with other transmitters, may also be performed.

In all of the methods and devices described herein, results, such as a shape estimate (e.g. contour coordinates) or a position estimate of an object, may be stored in a volatile or non-volatile memory. Additionally or alternatively they may be displayed on a display device. A display signal for a display device may be provided. Additionally or alternatively methods described herein are used to control a device. They thus could comprise the step of providing a control signal for a device.

The methods of the invention are preferably carried out using computing means, computing machines, data processing apparatus or any other device capable of carrying out stored instructions. Such a device may be static; although the invention can equally be used with mobile devices. Although certain aspects have been described with reference to steps carried by a device, it will be appreciated that a part or all of one or more of these steps may, in some less-preferred embodiments, be carried out on a remote processor, such as a network server, which is in communication with the device (e.g. over an RF channel); such arrangements are within the scope of the present invention.

Any of the definitions and features, optional or otherwise, described herein in the context of one aspect of the invention may, where appropriate, be applied to any of the other aspects also.

Certain preferred embodiments of the invention will now be described, by way of example only, with reference to the accompanying drawings, in which:

FIG. 1 is a perspective drawing of a user interacting with a device in accordance with the invention;

Figure 2A:
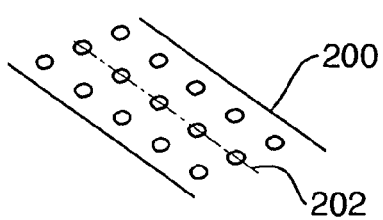
FIG. 2a is perspective drawing of a part of the device.

FIG. 1 shows a static device 2 comprising a display screen 4 and a surrounding frame 6. Flush-mounted on the frame are a top array 8 of transducers and a left-side array 10 of transducers. The top array 8 comprises two parallel rows 12, 14 of transducers. The transducers along each row are alternately a transmitter followed by a receiver. The transmitters in the upper row 12 are aligned vertically with those of the lower row 14. The left-side array 10 comprises three parallel columns 16, 18, of transducers. Again, transmitters and receivers alternate down the columns, with transducers of the same type being horizontally-aligned between the columns. The top-left corner region continues the pattern of the left-side array 10, but it could alternatively be a continuation of the top array 8. Of course, other patterns of transmitters and receivers are possible; however having transducers of the same type aligned perpendicularly to the axis of the array is preferred as it enables accurate steered propagation—or 'beamforming' about the axis of the array (i.e. beams can be directed beyond the edges of the frame 6). There may also be similar arrays (not shown) on the right-side of the screen 4 and at the bottom of the screen.

A user's right hand 22 is near the screen 4, interacting with the device, for example to direct a cursor (not shown) around the screen. However the user's left hand 24 (or equally the hand of a second user) is encroaching from the left side, moving in the direction of the arrow. For at least some of the transducer combinations in the arrays 8, 10, the right hand 22 and left hand 24 are at overlapping time-of-flight distances. This means that the motion path of the right hand 22 cannot readily be separated from that of the left hand 24, at least for those transducer combinations.

The location or movement or shape of the hand is not therefore readily discernable using conventional techniques.

Accordingly, the device transmits a signal from one of the transmitters and listens for responses at some or all of the receivers. Those receivers that exhibit a clean signals; i.e. one with a clear leading edge (e.g. from the extended finger tip of the hand 22), possibly followed by a later, second edge (e.g.

from another part of the hand 22 such as a knuckle), are noted in some way (e.g. in a memory array on the device). Those that are 'smeared' due to overlapping signals from other objects, such as from the left hand 24, are not noted in the same way.

Once this is done, a signal is transmitted from another of the transmitters, and the received signals are analysed as before. This may be repeated for every transmitter, until a matrix of transmitter-receiver combinations that are 'clean' has been formed (this matrix can be an abstract construct which may be manifested physically using any suitable data structure in a volatile or non-volatile memory of the device 2, or in any other appropriate way). The matrix entries may be binary (whether a clarity condition has been met or not) or may quantify a degree of clarity. It may not be necessary or appropriate to involve all the transmitters and all the receivers in this process: in some circumstances a subset of each may be used.

A image or map of the right hand 22 is then constructed using beamforming imaging techniques, but only using those transmitter-receiver combinations that were noted as 'clean' in the preceding stage. Of course, the image may be represented in the device's memory in any appropriate way, and is not necessarily stored in a recognised image file format.

Any suitable beamforming technique may be used, but the present embodiment employs delay-and-sum beamforming. Conceptually, the space around the device is divided into voxels (volumetric pixels), the centre-points of which are represented as 3D coordinate vectors. Each of these centre-points is at a specific time-of-flight distance for each transmitter-receiver combination. For each transmitter-receiver combination selected in the preceding step, a signal is transmitted from the transmitter and the response at the receiver is analysed (one transmit signal may be used by several transmitter-receiver combinations to allow a high update rate).

An impulse response is calculated for that combination. For each voxel centre-point, the contributions of the relevant part of the impulse responses of each of the selected transmitter-receiver combinations (i.e. the response at or around the appropriate time-of-flight distance for each combination) are summed together. Preferably, rather than summing the calculated impulse responses, which can result in positive and negative values cancelling out, the envelope or local energy of the impulse response is used in the summing step.

The device now has some information relating to the shape of the right hand 22, determined from the presence or absence of reflections at each voxel, as well as from information relating to the intensity of the reflection at each voxel, and possibly also information relating to Doppler shift or other factors. This information can then allow the device to perform transmit beamforming with some or all of the transmitters of the arrays 8, 10. This can be accomplished by the device first deriving an estimated outline of the hand 22 and then coordinating the transmission of sound from a plurality of transmitters so as to direct a beam towards all or a part of the hand 22. In one mode, the device transmits a relatively narrow beam towards a part of the hand 22; for example, an extended fingertip. This allows information about the shape and/or position of that part of the hand 22 to be determined to a higher degree of accuracy (for example, using smaller-scale voxels) than in the initial stages. The beam may be directed at different parts of the hand 22 at different times; it may, for example, be swept progressively across the whole of the object in a scanning pattern, or it may be directed towards parts of particular relevance to a user input. For example, if a pinching movement is identified as occurring, transmit beams may be directed alternately towards the tip of the thumb and towards the tip of the index finger, in order to characterise the motion of these parts in more detail.

Similarly to before, the device may, for each transmit beam, determine which receivers provide a 'clear' signal. Effectively a matrix may be formed with transmitter groups on one axis and receivers on the other axis (of course, not all possible groups of transmitters and not all receivers need be included in this matrix), recording whether that combination results in a signal satisfying a clarity condition. This determination may be similar to that set out above with respect to the matrix of individual transmitter-receiver pairs, possibly modified to allow for the different situation of having a plurality of transmitters; however, it is preferably still related to whether a clear leading edge is detectable, or two leading edges in succession. Rather than simply noting a binary result (whether the clarity condition is met or not), the matrix entries may record a degree of clarity on a quantitative or qualitative scale.

Once a set of receivers that give clear results with certain transmitter groups has been determined, these combinations are used to construct or refine a voxel-based 3D image as before. The image may be of higher spatial resolution since, by beamforming the transmit signal, a better signal-to-noise ratio is typically achieved.

It is not necessary to compute a full 3D voxel image; in some preferred embodiments, a sparse voxel representation, or list of voxels which are non-zero, is used. This can save memory and thus reduce overall system costs.

In a similar manner, some or all of the receivers may be grouped together to perform receive-side beamforming of the received signals. This may be performed in addition to transmit beamforming, in which case the receive focus will normally by directed at the same region as the transmit beam. Again, a matrix of transmitters against receiver-groups, and/or of transmitter-groups against receiver-groups, may be constructed and used to determine which combinations to use.

As the hand 22 moves, or as other objects appear or disappear, the clarity of various transmitter-receiver combinations (whether singly or in beamforming groups) is likely to change, as it is bound up in the physical reality beyond the device 2 (e.g. whether to objects are at similar time-of-flight distances as each other for certain combinations). The channel-clarity determining steps are therefore preferably repeated intermittently (for example, according to a schedule, or when noise or errors in the results are determined to exceed a threshold). The clarity determination has here been described as a separate temporal phase; however it is possible that the same data that is used to construct a voxel-based image is also used to determine the clarity of the combinations; for example, while some receivers are being used to determine information relating to the shape or position of the hand 22 (being those that are clear), signals from the other receivers may nonetheless still be being analysed in order to determine whether any of those becomes clearer than any currently in active use. Unlike transmit beamforming, where a plurality of simultaneous beams has the potential to introduce undesired noise, the received signals may be beamformed in any direction without causing any interference on any other beamforming operation. Where processing power is sufficient, a plurality of receive-side beams may be used simultaneously from the same or different receivers.

The location and shape of the hand 22 can be used to control a function of the device 2; for example, to control a music player function of the device (e.g. raising and lowering volume as a fingertip of the hand 22 is moved up and down the screen 4, respectively).

Figure 2B:
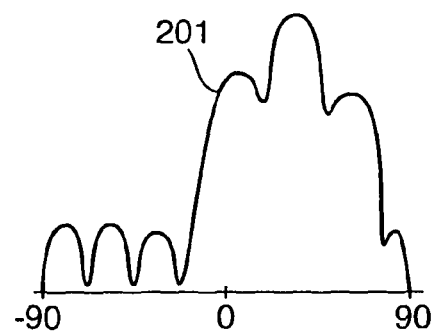
FIG. 2b is a graph of the signal received by a receiver of the device.

FIGS. 2a and 2b exemplify the use of receive-side beamforming to suppress energy from some angles while retaining energy from others. FIG. 2a shows a portion of the left-side array 10. The line 202 indicates an axis of the array. The angles from −90 degrees to +90 degrees in the horizontal axis of FIG. 2b are defined with reference to this axis 202. The vertical axis of FIG. 2b represents the intensity of the processed signal that results from beamforming using the receivers in the left-side array 10. The signals from the direction of the right hand 22 (i.e. to the right of a vertical plane through axis 202 when looking at FIG. 1) are received at high intensity, while those from the direction of the intruding left hand 24 are suppressed. The actual calculation of the beamforming parameters (e.g. the delays to apply to each receiver's signals) is performed in any suitable way; for example, by first detecting the presence of the left hand 24 and then actively placing zeros or near-zeros or energy cancellation in those directions, while actively placing steering vectors in the direction of the right hand 22. Energy from certain directions can be cancelled out by designing the beamforming scheme as a spatial filter, letting signals from some directions come through while blocking others. Adaptive, i.e. data-driven cancellation, such as the minimum-variance method, or Capon or Apes or specific null-steering methods can be employed. The latter can be constructed by creating a filter, receiving input from all the input channels, and suitably delaying, weighting and summing the inputs so that the desired directivity for steering and cancellation is obtained. The filter can be implemented in the time-domain, frequency-domain, time-frequency domain, Fractional Fourier domain, chirp domain or any other suitable domain. Adaptive beamforming may thus be used to steer in the direction of the right hand 22 while suppressing all other directions. Traditionally, adaptive beamforming schemes are complex and costly. However the present arrangements are generally simpler and can therefore provide substantial reductions in CPU costs, making adaptive beamforming schemes feasible in low-cost, hand-held devices.

Figure 3:
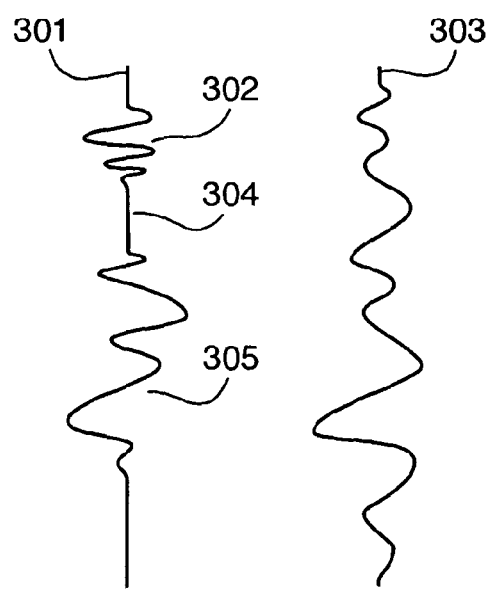
FIG. 3 is a diagram of two impulse responses calculated from received signals.

FIG. 3 shows what the received impulse response 301 from a channel or combination meeting a clarity criterion looks like, in comparison to the impulse response 303 from one that does not. The impulse response 301 has a section 302 that exhibits a short, clear pulse, followed by a period 304 of relatively low energy, before a section 305 where the energy level starts fluctuating. This clear signal portion 302 followed by low energy followed by further signals (which may or may not have a clear leading edge) is identified by the device 2 as indicative of a combination that contains information; i.e. reflections that are likely to come from a single object or part. By contrast, the impulse response 303 shows no clear isolated signal part and no clear leading edge, and the corresponding combination is likely not to be used in the subsequent imaging.

Multiple successive impulse responses are preferably analysed together by composing them into an impulse response "image", in which consecutive, discretely-sampled impulse responses are aligned side-by-side to form a two-dimensional array (or image if the array values are represented as greyscale pixels). The detection of a peak or leading edge or otherwise interesting part in an impulse response image could happen in any number of ways.

For instance, a leading edge may be detected using a leading edge detector which moves a sliding frame around the impulse response image, computing the ratio of the maximum amplitude and the median or average amplitude within the frame.

Another approach to detecting a leading edge is to move a sliding window down an impulse response 301, where the window is divided into an upper window and a lower window. If the energy levels in the upper window is significantly less than in the lower window, an edge is detected. The test as to whether one set of amplitudes is higher than another (i.e. whether the energies in the upper window are greater than those in the lower) can be conducted using a statistical test to check if the mean of one population is significantly above the mean of a second population; for example, by assuming normal distributions and using a t-test.

A possible better way to detect a leading edge is to use a constant false alarm rate (CFAR) filter, as described in "Statistical Signal Processing" by L. L. Scharf, chapters 4.9-4.12. The CFAR filter can be used to examine the presence of a known signal in unknown levels of noise. The known signal, or even a linear space of known signals, would here be a set of empirically-observed leading-edge signals, such an impulse response 302 known to contain a clear reflection, plus other similar and possibly phase-shifted signals. These provide a low-dimensional space of signals known to exhibit desirable leading-edge characteristics.

The CFAR subspace filter then provides a statistical test to whether a given impulse response 302, 303 contains a leading edge or not. This technique is particularly beneficial when working with impulse response signals, since the vast dynamic range may require a large number of bits to represent, with both the least-significant bits (LSB) and the most-significant bits (MSB) carrying information. The total number of bits can be magnitudes larger than the bit-rate of the sampling system. Hence, precise, but sometimes highly fluctuating values, represent background noise and foreground objects, which makes it difficult to provide exact thresholds defining the foreground and background, as is customary in other fields, such as image processing.

The CFAR-filter, however, is invariant to scaling of the match signal; rather, it obtains a uniformly most powerful test limit for a given false-alarm probability, and its probability of misses is dependent only on the signal-to-noise ratio. Moreover the CFAR filter can be extended to work for multiple impulse responses (i.e. multiple time frames for a single channel), and using a 2D match filter mask, such as a line-filter, can provide even more robust detection of a leading edge. The CFAR filter can further be extended to work over multiple time-steps and multiple channels, i.e. a 3D CFAR filter, or over multiple channels over a single time-frame, i.e. another representation of a 2D CFAR filter.

The use of a CFAR-filter with impulse response images also enables better detection of channels which are "clear". Once the clear channels have been detected, the system can decide to use only certain parts (e.g. a certain time frame after signal transmission) of the impulse response signal for imaging. Typically, the parts of the impulse response which are not informative, i.e. not "clear", are kept out of the imaging computations.

More generally, it is possible to inspect an impulse response for parts having a high level of information or entropy. A leading edge is one type of information. Generally however, a sliding window inspection of an impulse response can be used to decide which subparts of the response are "informative", i.e. by studying the distribution of taps. Suitable measures include, among others: negentropy; Kullback-Leibler divergences in temporal, spatial or other domains; degree of match with contrast functions such as skewness or kurtosis; and measures of sub- or super-Gaussian distributions.

A "clear" channel can also be detected in terms of its self-consistency. To detect such self-consistency, a similar approach can be adopted to the previously-described algorithm for imaging using voxels; but it can be preferable in this context to use multiple transmissions rather than a single transmission, so that impulse responses can be studied in unison. Self-consistency may be determined by autocorrelation or any other suitable method. The channels and the channel time frames showing a high degree of self-consistency can then be used for imaging.

FIGS. 4 to 9 show various embodiments having a transmitting surface, which either comprises or overlaps a display screen. Such an arrangement facilitates positioning of the leading fingertip, since the fingertip becomes the 'leading point' relative to the transmit source.

Figure 4:
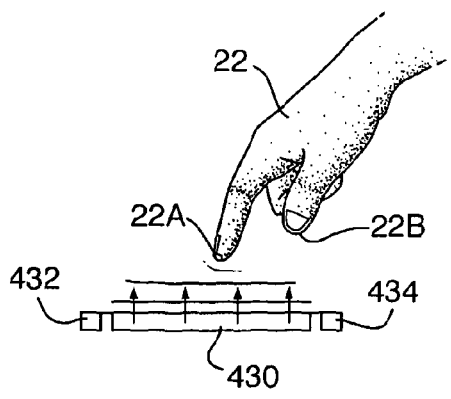
FIG. 4 is a figurative, partial side view of a second device according to the invention, illustrating a principle of its operation.

FIG. 4 shows an embodiment in which an acoustic signal (indicated by four arrows) is transmitted outwardly from the surface of a display screen 430 towards a user's hand 22. In this illustration it can be seen that, as will normally be the case, the user's fingertip 22A is the closest point of the user's hand 22 to the screen 430. Two microphones 432, 434 are located on either side of the display screen 430, and receive respective echoes from the user's hand 22, and fingertip 22A in particular. By determining the times-of-flight (TOF) of the acoustic signal from the display screen 430 to the fingertip 22A and to the respective microphones 432, 434, information relating to the position of the fingertip 22A can be determined.

Although the user's thumb 22B may be at a shorter TOF distance from the display screen 430 and the right-side microphone 434 than the user's fingertip 22A, nonetheless when the timings of both microphones 432, 434 are combined, a processor in the apparatus (not shown) can nonetheless determine that the fingertip 22A is closer to the screen surface than the thumb 22B are therefore track the fingertip 22A for a user interaction, such as controlling the position of a cursor shown on the display screen. This ability to identify a point on the user's hand nearest to the screen surface is facilitated by the acoustic signal being transmitted from across the entire area of the display screen, rather than from a point transmitter. In particular, when the display screen 430 is bordered by several microphones, it is more likely that a significant number of them will satisfy a clarity condition than if the acoustic signal were emitted from a single point.

Figure 5:
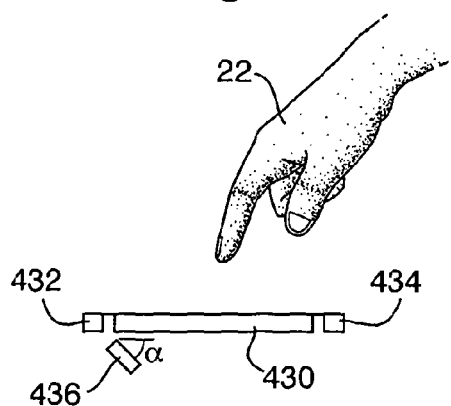
FIG. 5 is a more-detailed figurative, partial side view of the second device.

FIG. 5 shows the mechanism by which the display screen 430 is caused to transmit the acoustic signal. An acoustic exciting transducer 436 is situated behind and spaced away from the screen 430, pointed towards the back of the screen at an angle $\alpha$. The exciting transducer 436 is arranged to transmit a pulse or a continuous signal into the display screen 430. The transducer 436 may be a conventional electrostatic ultrasound transducer, such as the Series 600 or Series 7000 transducers from SensComp, Inc. Preferably, however, it is a cMUT (capacitative micromachined ultrasonic transducer). One such transducer is described in "The design and characterization of micromachined air-coupled capacitance transducers" by D. W. Schindel et al., IEEE Trans. Ultrasonics and Ferroelec. Freq Control 42 (1995), pp. 42-50.

Figure 6:
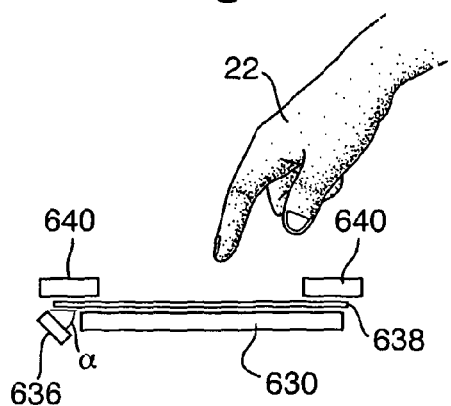
FIG. 6 is a figurative, partial side view of a third device according to the invention.

FIG. 6 shows a variation of the embodiment of FIG. 5 in which, instead of the exciting transducer 636 being directed towards the display screen 630, it is directed towards a layer of a transparent medium 638 which is placed on top of, and spaced away from, the display screen 630. The transparent medium 638 may be made of a membrane or plate, for example of acrylic glass; i.e. poly(methyl methacrylate). In the embodiment of FIG. 6, the exciting transducer 636 is hidden from view behind a surrounding frame 640 which borders the display screen 630. This leads to a more elegant appearance and allows a reduction in the overall thickness of the screen assembly. A similar frame arrangement could be used in other embodiments also.

Acoustic receivers are not depicted in FIG. 6, but could be located behind grilles in the frame 640. The transparent medium 638 can be attached to the screen 630 or the frame 640 by any suitable means; for example, a thin bolt, or two or more miniature pillars, support bars, or supporting springs, thereby creating a set of free-free boundary conditions. The transparent medium 638 may alternatively extend into a support groove or slot (not shown) of greater width than the thickness of the medium, such that the medium has freedom to move within the confines of the groove. The groove may surround the entire perimeter of the medium 638, or just a part of it. The transparent medium is thus retained between the exciting transducer 636 and the frame 640, yet has freedom to vibrate. Alternative support arrangements may be used. Various suitable configurations are described in "Formulas for Natural Frequency and Mode Shape" by Blevins, R. D. (1979, Malabar, F L: Krieger).

Figure 7:
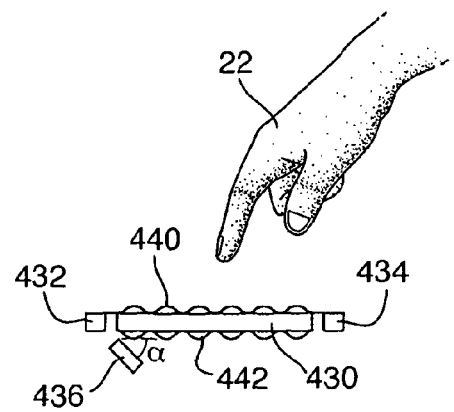
FIG. 7 is a figurative, partial side view of the second device operating in a first mode.
Figure 8:
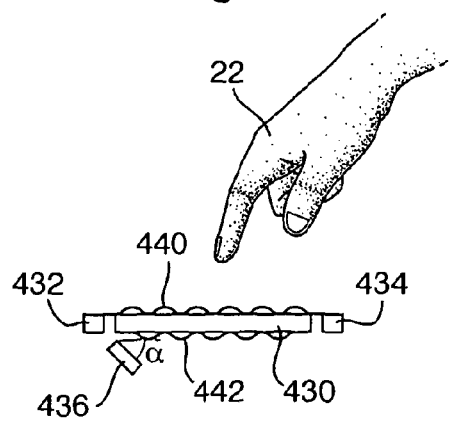
FIG. 8 is a figurative, partial side view of the second device operating in a second mode.

FIGS. 7 and 8 illustrate the waves that are excited in the screen by the exciting transducer 436. The exciting transducer 436 transmits acoustic energy towards the rear face of the display screen 430. This causes a wave to propagate in the display screen 430 (or, in alternative embodiments, in a transparent medium overlying the display screen). These waves are indicated by the waveforms 440 and 442 (not to scale). The waves couple into the air in front of the display screen 430, thereby causing an acoustic signal to be transmitted towards the user's hand 22.

The waves arising in the display screen 430 are Lamb waves (guided acoustic waves in plates). They are solutions to the wave equation for linear elastic waves, subject to boundary conditions defining the geometric structure of the display screen 430. The waves are highly dispersive, meaning that the wave speed depends on the frequency. This stands in contrast to acoustic waves propagating in air. The solutions to the Lamb wave equations represent the kinds of wave that can propagate, based on the properties of the medium and the boundary conditions. They belong to two distinct families: symmetric or extensional-mode waves, in which the upper-surface waveforms 440 mirror the lower-surface waveforms 442, as shown in FIG. 7; and anti-symmetric or flexural-mode waves, in which the upper-surface waveforms 440 are in antiphase with the lower-surface waveforms 442, as shown in FIG. 8.

To generate these Lamb waves, the angle $\alpha$ of the exciting transducer 436 to the display screen 430 must match the critical angle. Critical angles are explained in detail in the paper "High contrast air-coupled acoustic imaging with zero group velocity lamb modes", by S. Holland and D. E. Chimenti, Elsevier Ultrasonics, Vol. 42, 2004, pp. 957-960. For most frequencies, there are only a few, discrete, incident angles satisfying the phase match criterion; i.e. which are able to excite Lamb waves. However, at the zero-group-velocity frequency, there is a wider range of angles $\alpha$ for which the energy from the exciting transducer 436 couples effectively at the same frequency. Therefore, if a focussed exciting beam, spanning a range of angles, at the zero-group-velocity frequency is incident on a plate (such as the display screen 430), the entire range of angles near the zero-group-velocity point is transmitted efficiently from the air to the plate, and also through the plate to the air on the opposite side, at that frequency. This leads to a dramatically higher transmission into the air at the front of the display screen 430 than is the case for other transmission modes. Preferably therefore, the frequency and the angle of incidence $\alpha$ are chosen so as to match the zero-group-velocity frequency, and the exciting transducer 436 has an angle of inclination to match with the zero-group-velocity mode.

Several exciting transducers may be arranged behind the display screen 430, for example around its periphery, all transmitting into the display screen 430 (or, equivalently, into a transparent material, such as acrylic glass, overlaying the display screen). By exciting several such transducers, or selectively employing a subset of the transducers, directive transmission into the display screen 430 can be accomplished, thereby forming points or areas of particularly high intensity in the display screen 430. This causes the acoustic signal to be transmitted into the air in front of the display screen 430 not uniformly across the whole surface of the display screen, but with particular intensity in a selected region of the screen 430. This can be employed to scan spatially the area in front of the display screen, creating stronger reflections or "virtual transmission points" from certain zones in front of the screen 430 than from others.

Figure 9:
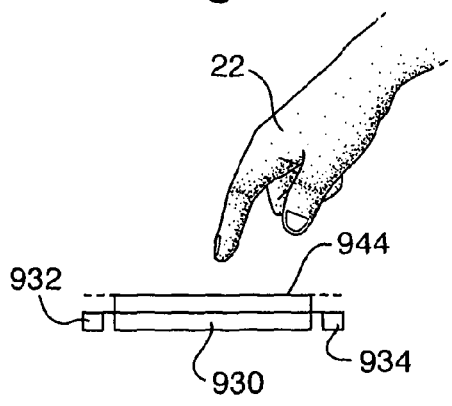
FIG. 9 is a figurative, partial side view of a fourth device according to the invention.

FIG. 9 shows an alternative embodiment which employs a different way of using the screen as an ultrasonic transmitter. A foil 944 is situated adjacent the front face of the display screen 930, with an air gap between the foil 944 and the screen 930. It can be made to vibrate acoustically in a piston-like fashion using a piezo-actuator, i.e. vibrating the entire foil 944 as a whole. The foil 944 has a thickness of between 0.1 to 2.0 mm and sits 1 to 10 mm away from the front of the displaying surface. In some embodiments, in addition to being able to transmit an ultrasonic acoustic signal, the foil 944 may be used to transmit audible sound for audio applications; for example, it may be used for playing the soundtrack to a movie being shown on the display. Suitable foils or membranes, and approaches to arranging them in front of a display screen, are described in US 2009-0285431, U.S. Pat. No. 6,720,708 and U.S. Pat. No. 7,038,356. These disclosures aim to produce audible sound; however the present inventor has realised that such approaches may conveniently be adapted for use in the present invention.

Figure 10:
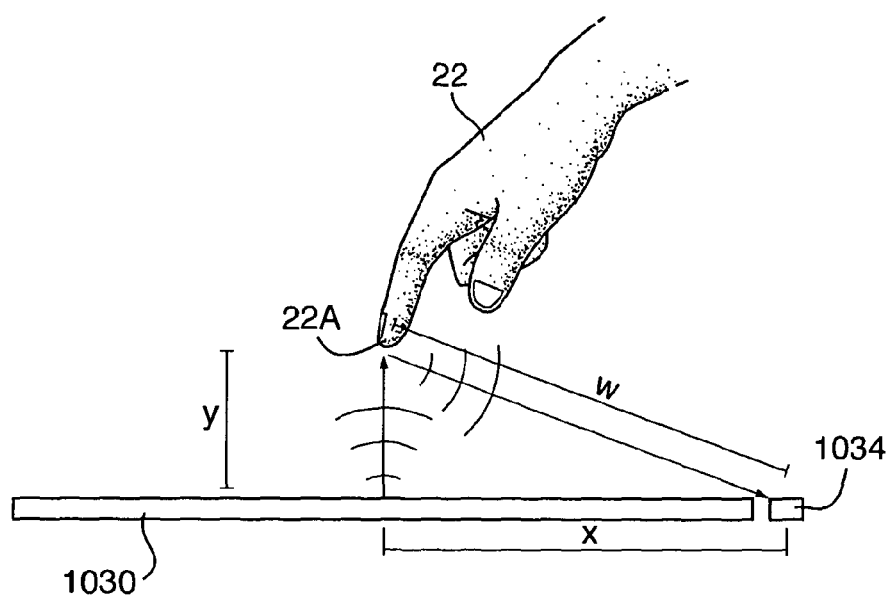
FIG. 10 shows in more detail how the position of the fingertip can be estimated above a display screen.

FIG. 10 shows in more detail how the position of the fingertip 22A can be estimated above a display screen 1030 using any one of the above physical arrangements for transmitting a signal from the display screen 1030.

An acoustic signal (e.g. a pulse or chirp) is emitted from the screen 1030. This is reflected off the fingertip 22A, and is received by the receiver 1034. The time-of-flight of the sound moving from the surface of the display screen 1030 to the fingertip 22A and on to the receiver 1034 is measured. This quantity can be estimated by detecting a leading-edge of the echo in the received signal. Alternatively, it could be computed from a calculated impulse response signal; i.e. not directly from the raw received signal. The emitted signal could be a pulse, a chirp, a continuously or continually transmitted signal, a pulse train, or any other suitable signal; and an impulse response may be calculated therefrom.

The position of the fingertip 22A cannot be unambiguously resolved by using a single receiver alone. Nonetheless, with a single receiver 1034, multiple time-of-flight estimates can be used to infer the position of the finger in 3-space, by using a Pythagoras-like-principle. Considering the single receiver 1034 shown in FIG. 10, the height of the fingertip 22A from the screen is denoted by y; the distance from the receiver 1034 to the point on the display screen 1030 nearest the fingertip 22A, by x; and the length of the direct path between the fingertip 22A and the receiver 1034, by w.

Suppose a time-of-flight value is measured for the receiver 1034, equal to a distance k.

Then k=w+y, and so w=k−y. By Pythagoras' theorem, $$w=\sqrt{x^2+y^2}$$

and hence $$(k-y)^2=x^2+y^2.$$

Rearranging, this gives:

$$k^2 - 2ky + y^2 = x^2 + y^2$$
$$k^2 - 2ky = x^2$$
$$-2ky = x^2 - k^2$$
$$y = \frac{k}{2} - \frac{x^2}{2k}$$

Thus the point (x, y) lies on a parabola determined by the measured value k. If there were more channels available, the point (x, y) could be worked out as intersection point, or, when more channels than the minimum are available, by an approximation that could be computed i.e. by iterative means using a steepest-descent, gradient search, conjugate gradient, simplex or other method for solving the approximation problem. This two-dimensional example assumes that the fingertip 22A is known to be in or adjacent a plane perpendicular to the display screen 1030, so that the position of the fingertip 22A along a z-axis, perpendicular to x and y, is unimportant.

In the more common situation of three-dimensional sensing, where a determination of the coordinates (x, y, z) is desired, the coordinate x can be replaced by the term $\sqrt{x^2+z^2}$ in the equations above, and it will be seen that the corresponding intersection surfaces are revolutions of the parabola functions around an axis through the receiver element 1034, but limited by the edges of the screen. The position of the fingertip is then derived by considering the intersection of three or more such surfaces in 3-space. If receivers of shapes other than an effective point receiver are used—for example, if the display screen 1030 is also a receiving surface, or if an elongate receiving element were used—then a different set of geometric equations would arise. In a simplified embodiment, using the same surface as a transmitter and a receiver could be used to detect a situation where the user is lifting his finger from the surface or pushing it down on it.

Thus methods have been described herein for detecting and using a subset of channels in order to generating useful estimates from a scene. Arrangements in which an acoustic signal is transmitted from a transmitting surface have also been described.

The invention claimed is:

1. A handheld device comprising:
   a display screen and a plurality of acoustic transducers as part of a user interface, said transducers being arranged in at least two parallel rows; and
   a processing system configured to process a user input to the handheld device by using acoustic signals reflected off an object to estimate a shape and/or position of the object, and/or to characterise a motion of the object, the acoustic signals being transmitted through air towards the object by said plurality of acoustic transducers and/or being received through the air from the object by said plurality of acoustic transducers.

2. The handheld device of claim 1 wherein the rows are parallel with an edge of the device.

3. The handheld device of claim 1 wherein each row comprises at least three transducers.

4. The handheld device of claim 1 wherein each row is longer than the distance between the rows.

5. The handheld device of claim 1 wherein the transducers are substantially regularly spaced along the rows.

6. The handheld device of claim 1 wherein the distance between the rows is less than half the maximum wavelength transmitted by one or more of the transducers in use.

7. The handheld device of claim 1 comprising three or more parallel rows of transducers.

8. The handheld device of claim 1 wherein both rows of transducers are on the same side of the display screen.

9. The handheld device of claim 1 wherein the display screen is rectangular with the two rows of transducers being parallel to an edge of the rectangle.

10. The handheld device of claim 1 wherein the display screen is surrounded by two concentric rings of transducer elements.

11. The handheld device of claim 10 wherein the two concentric rings conform to the shape of the display screen.

12. The handheld device of claim 1 wherein the display screen is arranged to transmit an acoustic signal.

13. The handheld device of claim 1 having a transmitting surface which comprises the display screen, or which is disposed in substantially overlapping relationship with the display screen, and which is arranged to transmit an acoustic signal.

14. The handheld device of claim 13 wherein the transmitting surface is further arranged to receive a reflection of an acoustic signal from an object of interest.

15. The handheld device of claim 1 wherein the processing system is configured to control some or all of the transducers to transmit an acoustic beam in a predetermined direction.

16. The handheld device of claim 15 wherein the processing system is configured to direct acoustic energy towards an approximate location of the object.

17. The handheld device of claim 1 wherein the processing system is configured to apply receive-side beamforming to acoustic signals received at the transducers.

18. A method of operating a handheld device comprising a display screen and a plurality of acoustic transducers arranged in at least two parallel rows, the method comprising using acoustic signals reflected off an object to estimate a shape and/or position of the object, and/or to characterise a motion of the object, the acoustic signals being transmitted through air towards the object from said plurality of acoustic transducers and/or being received through the air from the object by said plurality of acoustic transducers.

19. The method of claim 18 wherein the handheld device has a transmitting surface which comprises the display screen, or which is disposed in substantially overlapping relationship with the display screen, the method further comprising transmitting an acoustic signal from the transmitting surface.

20. The method of claim 19 comprising using the transmitting surface as a receiving surface to receive a reflection of the acoustic signal from an object of interest.

21. A non-transitory computer-readable medium bearing computer software configured, when run on a handheld device comprising a display screen and a plurality of acoustic transducers arranged in at least two parallel rows, to use acoustic signals reflected off an object to estimate a shape and/or position of the object, and/or to characterise a motion of the object, the acoustic signals being transmitted through air towards the object by said plurality of acoustic transducers and/or being received through the air from the object by said plurality of acoustic transducers.

* * * * *